April 4, 1961 R. G. ALEXANDER, JR 2,978,683

INFORMATION STORAGE DEVICE

Filed Sept. 8, 1958 2 Sheets-Sheet 1

INVENTOR.
REXFORD G. ALEXANDER, JR.
BY
J. Walter Schilpp
ATTORNEY

April 4, 1961

R. G. ALEXANDER, JR 2,978,683

INFORMATION STORAGE DEVICE

Filed Sept. 8, 1958

2 Sheets-Sheet 2

*INVENTOR.*
REXFORD G. ALEXANDER, JR.
*BY*
J Walter Schilpp
ATTORNEY

United States Patent Office 2,978,683

Patented Apr. 4, 1961

2,978,683

INFORMATION STORAGE DEVICE

Rexford G. Alexander, Jr., Norristown, Pa., assignor to Burroughs Corporation, Detroit, Mich., a corporation of Michigan Filed Sept. 8, 1958, Ser. No. 759,493

9 Claims. (Cl. 340—174)

This invention relates to improvements in information storage panels and assemblies of such panels.

It is known in the art of electrical computers and digital control and digital logical devices to store information of a binary nature in individual bistable elements, capable of assuming one or the other of two stable states. Usually for this purpose, elements formed of ferromagnetic material, often called "cores," have been employed, preferably those having a strong tendency to assume one of two particular states of magnetization along substantially the same axis but opposite in direction. These are caused to be magnetized in a particular direction according to the nature of the binary information to be stored. A common mode of such storage is to allow magnetization in one direction to correspond to the digit value "one" and to allow magnetization in the opposite direction to correspond to the digit value "zero."

The stored value may be recovered from the magnetic elements by applying a magnetic field sufficient to restore the magnetic element to a reference one of its values such as the "zero" state. If it was already in such state, it will be only slightly affected by such application, but if it was in the other, or "one" state, it will suffer a reversal of flux which will induce a voltage in any conductors magnetically coupled to it. The particular ways of performing this operation are many. One electrical conductor may be used to store information, to produce the restoring field, and to indicate the flux change in the magnetic element by a voltage pulse appearing across the electrical conductor; or a number of electrical conductors may be provided to perform, either alone or in conjunction with other electrical conductors, any or any combination of the functions of storing, restoring, and indication (commonly known, respectively, as "writing," "reading" or "reading out," and "sensing," inter alia). Since the convenient design of devices using such storage is greatly facilitated by the provision of a plurality or group of such storage elements, often called a "core matrix," it is desirable that they be made small. If they are small, it is necessary for efficient design that the conductors pass close to them for the three operations mentioned above, since it is desirable to minimize the currents required to provide sufficient fields at the cores, and to maximize the voltage induced in the sensing windings by flux changes in the cores.

A convenient conventional design of panel of such storage cores comprises a rigid base or sheet of insulating material such as laminated paper-base phenolic, magnetic cores consisting of thin films of material suitable for the purpose, such as the nickel-iron alloys known as the permalloys, and suitably insulated thin strips of electrical conducting material such as copper, all adhering to the base or to each other. This rigid combination of all the needed elements has many obvious advantages—it is a mechanically rigid unit, terminals may easily be attached to the base for making connection to the copper strip conductors; it may be standardized and produced in quantity.

Such a rigid information storage assembly has some disadvantages. The number of cores which can be provided in a single panel on a base of acceptable size is limited. If the number of cores is to be increased beyond such number, this must be done by interconnecting a number of such panels. The making of connections is always a source of expense because it requires either skilled manual labor or in lieu thereof rather elaborate tooling or jigging arrangements. The best reliability that can be hoped for in a connection is that it may be as reliable as the unbroken conductor. Since the connections to and among or between such panels are often numerous and complicated in geometry, there is a great possibility of error even by careful operators. Also, in the fabrication and handling of the unit panels themselves, defect or accident to either a core or a conductor will require either that the parts adhering to the base be removed (usually with some difficulty and danger of injury to the cores or the conductors or both) or that a good conductor pattern be discarded with a defective core or that good cores be discarded with a defective conductor. If, in field use, a given panel becomes defective, the connections to it must be removed and made anew to the replacement panel, usually under conditions not so favorable to good workmanship and avoidance of error as would prevail in the factory.

A less immediate inconvenience of the kind of assembly described is that a given conductor pattern is firmly fixed with a given matrix of cores; it is not possible to maintain separate stocks of cores and a variety of preformed conductor patterns for bringing together as particular requirements arise.

My invention consists broadly in the provision of one or more separate panels of matrices of storage elements mounted on bases and of patterns of continuous flexible conductors maintained in suitable relation each to the others by flexible positioning means; the placing of the panels in proximity to selected parts of the conductor pattern to produce the operating equivalent of a panel of storage elements provided with coupling conductors as in the known art; and the utilization of other parts of the conductor pattern to constitute some or all of the connections between, among, or with the coupled panels.

One important object of my invention is to produce data storage matrices and assemblies thereof interconnected having a reduced number of joints in the conductors forming an essential part thereof.

Another important object of my invention is to produce by varying arrangements of like parts assemblies of such matrices interconnected in a wide variety of shapes and dimensions.

Another important object of my invention is to produce such assemblies in which all or a part of the bistable storage elements may be replaced without disconnecting any of the conductor connections to or within such matrices.

Another important object of my invention is to produce such assemblies with a reduced chance of error in the interconnections within such assemblies.

Another important object of my invention is to produce such matrices and such assemblies in which the conductors may be removed and replaced with another pattern of conductors without injuring the bistable storage elements in such matrices.

Another important object of my invention is to produce such matrices and particularly such connected assemblies by means economical of skilled labor.

Other objects and advantages of the invention will become apparent from the following description, appended claims and accompanying drawings wherein;

The embodiment of my invention most easily visualized consists of a number of panels of magnetic cores which, according to the prior art, would be covered with conductors firmly attached to the panels in particular positions to provide the desired coupling between the various conductors and the various cores. In my invention, the necessary conductors are not attached individually to the panels. Instead, I use a flexible insulating sheet, such as polyethylene or mylar sheet, to which flexible conductors (for example, copper strip a few thousandths of an inch thick) are fastened. Coupling to the cores may be achieved by pressing the conductors on the flexible sheet against a panel bearing the cores. The sheet keeps the conductors in their proper relative positions over the surface of the panel, yet allows the conductors to be handled as a flexible whole. My invention can provide patterns of conductors for any desired number of panels, with connections between panels composed of the same strips of copper that constitute the coupling patterns. Because of the flexibility of the conductors and the sheet to which they are attached, the various panels bearing magnetic cores may be stacked or packed with the proper conductors on the sheet pressed against them, and the interconnecting parts of the conductors and the sheet may be bent or folded as required to fit. The conductors may be adherent to opposite sides of a single flexible sheet; or they may be laminated between different layers forming the sheet; or they may even be molded in place in the sheet during its process of formation.

Figure 1:
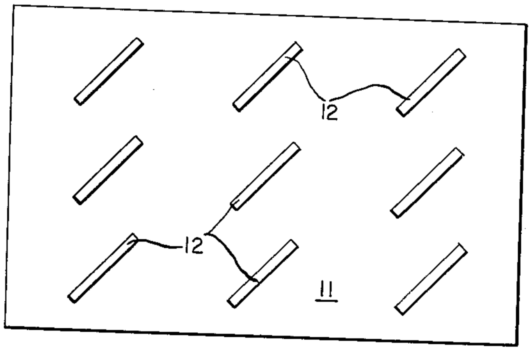
Fig. 1 shows a group of magnetic elements mounted on a base.
Figure 2:
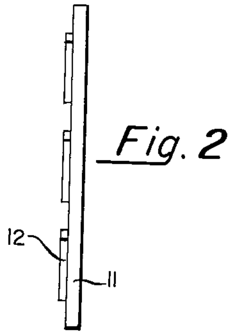
Fig. 2 shows a side view of the group of Fig. 1.

In Figs. 1 and 2, 11 is a base of high-resistivity or insulating material, on which there are fixed magnetic elements or cores 12. These cores according to present practice preferably have a substantially rectangular hysteresis loop, and an axis of preferred magnetization along their long dimension; but my invention comprehends other bistable characteristics and other shapes of the cores also, e.g. cores of circular plan, or cores subdivided into a number of parallel strips. The assembly of Figs. 1 and 2 illustrates an element of my invention, shown separately for clarity.

Figure 3:
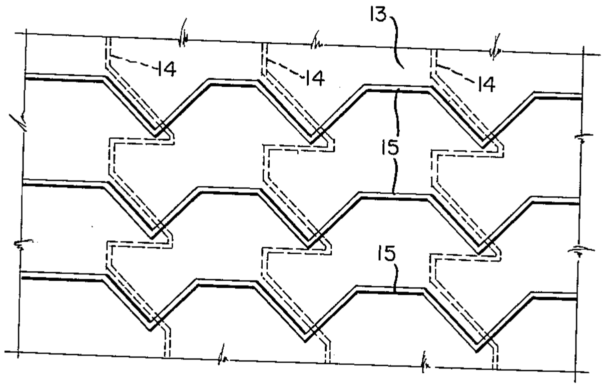
Fig. 3 shows a coupling area, part of a pattern of conductors mounted on a flexible insulating sheet.
Figure 4:
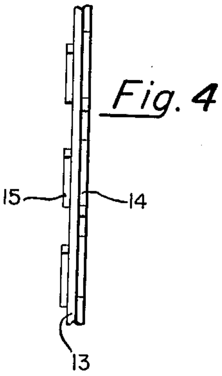
Fig. 4 shows a side view of the coupling area of Fig. 3.

In Figs. 3 and 4, 13 is a flexible positioning means of high resistivity or electrically insulating, such as a sheet of polyethylene, having affixed or adherent to one side conductors 14 and on the other side, affixed or adherent to 13, conductors 15. As an example of an operable arrangement these conductors are so disposed that if the particular portion of the assembly of conductors and insulating positioning means shown in Figs. 3 and 4, and designated hereinafter as a "coupling area," is superimposed on the panel of cores shown in Figs. 1 and 2, each core 12 viewed in a direction normal to base 11 will be crossed near its central point by a portion of one conductor 14 and a portion of one conductor 15, both such portions being approximately if not exactly at right angles to the axis of the core 12. Such orientation of conductors is conventional being such as to produce maximum inductive coupling of the conductors to the core. The idea of means flexible yet capable of determining position may seem self-contradictory; actually it is exemplified in flexible plastic scales and steel tapes which, despite their flexibility, position their graduations with respect to each other.

The "New Standard Dictionary" published by Funk & Wagnalls of New York (1949) defines "develop" . . . "To change the form of (a surface) by bending or unbending without deforming or changing its infinitesimal parts." Accepting this definition and recognizing that physical objects are only approximations to mathematical concepts such as surfaces, it may be stated that the pattern of conductors fixed to a flexible plastic sheet is stably developable, in that the pattern may be bent or developed without such alteration of the relative position of the conductors with respect to each other as would produce an alteration from the original pattern if the pattern thus bent or developed were developed again back to its original surface conformation. Colloquially expressed, the pattern may be bent and then bent back without leaving any conductor displaced from its original position. This test is, of course, geometrical and is not intended to imply that a pattern of conductors which had, for example, such physical properties that they could be bent successfully but would break upon being then straightened, would not be stably developable.

One form of flexible positioning layer having conductors fixed to it is found in the conductors mounted upon or in fluorocarbon plastic base sheets offered commercially by Sanders Associates, Incorporated, of Nashua, New Hampshire, and described in their engineering bulletin entitled "Flexible Kel-F Printed Circuit Cables." (Kel-F is a trademark of the M. W. Kellogg Company, Chemical Manufacturing Division, Jersey City, New Jersey.) The various techniques known in the art under the general title of "printed circuits," which in common parlance includes circuits which are produced by etching and other means not printing, are applicable to the production of conductor patterns suitable for the purposes of this invention, provided that a flexible backing material is used. It is an advantage of such techniques that the conductor disposition may be determined by a master pattern and thus, except for actual defects from defective materials or manufacture, the particular interconnection of conductors at various parts of the pattern is determined once and for all. Accidental misconnections from human error are highly improbable. My invention is not restricted to conductors or conductor patterns formed by such techniques, but attention is invited hereby to the common knowledge of numerous ways of producing such conductors and conductor patterns in quantity, with negligible likelihood of error in connections, and in forms suited for use in the practice of my invention.

While Fig. 3 shows the use of two groups of conductors 14 and 15, it is evident that additional groups of conductors may be provided by providing additional flexible layers similar to 13 bonded to the conductor pattern of Fig. 3 and additional layers of conductors bonded to the said additional flexible layers; and, since the present art permits satisfactory conductors of thicknesses of the order of a thousandth of an inch, numerous layers of conductors separated from other layers of conductors by flexible insulating layers may be provided without causing the outermost layer of conductors to be too far from the cores to provide adequate coupling to such cores. It is also evident that additional conductors may be added to a conductor pattern as described by cementing or other means providing sufficient attachment and insulation without departing from the bounds of my invention. Another alternative construction is to mold the conductors in the flexible material. The combination of conductors and flexible positioning means will be referred to hereinafter as the positioned conductor pattern; it will include coupling areas and connections between or to such coupling areas.

Figure 5:
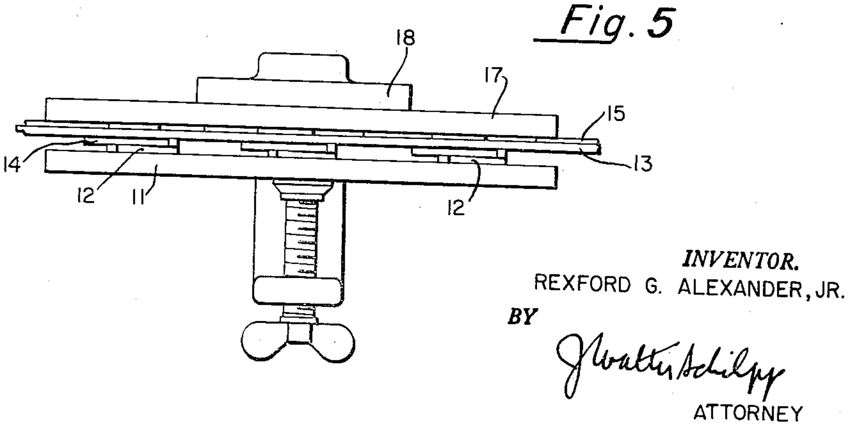
Fig. 5 shows the panel of Fig. 1 combined with a pattern including coupling areas as shown in Fig. 2 to produce a magnetic memory matrix according to one embodiment of my invention.

Figure 5 shows an assembly consisting of matrix of magnetic cores 12 on a base 11, as shown in Fig. 1, pressed against a positioned conductor pattern including a coupling area as shown in Fig. 3, pressure being applied by rigid block 17 and compressing means 18 (portrayed for simplicity as a conventional C clamp); the whole comprising a matrix of cores 12 inductively coupled appropriately to conductors 14 and conductors 15 according to the known art, but having the novel advantage that either the magnetic matrix or the positioned conductor pattern may be released for removal by simply releasing the pressure means.

Figure 6:
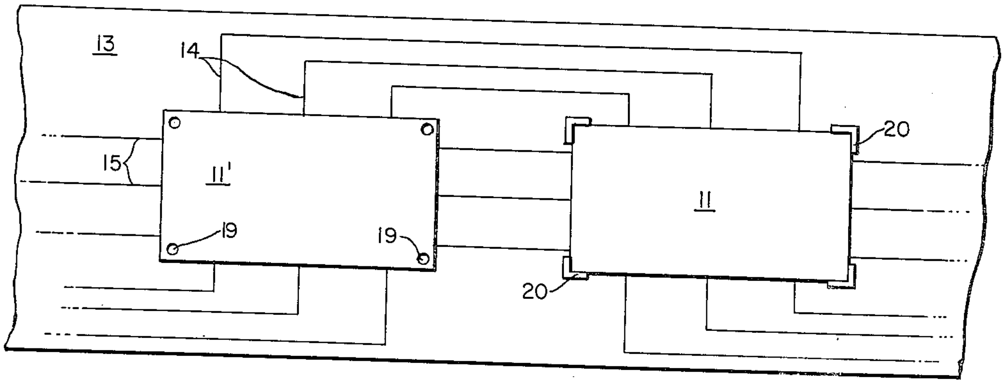
Fig. 6 shows the elements illustrated in Fig. 1 and Fig. 3 assembled according to my invention, and indicates some techniques useful in practicing my invention.

Fig. 6 shows two techniques useful in the practice of my invention in order to facilitate the proper placement of the matrices 11 and 11' of magnetic cores 12 relative to two of the coupling areas as illustrated in Fig. 3 but here concealed by the superposition of the bases 11 and 11' thereon. Since 13 may be made of transparent materials it is here shown so. The two sets of conductors 14 and 15 are shown continuous in such fashion that each conductor of conductors 14 and of conductors 15 is continuous from one side to the other of the figure, each such conductor passing in proximity to some cores 12 on the base 11 and on base 11', the intermediate portion of each conductor serving to make connection between its parts in the coupling areas coupled to cores 12 on bases 11 and 11' and the extreme portions of each conductor affording connection with such parts. Further illustrated in Fig. 6 are positioning means 20, consisting of suitable partially enclosing members molded in positioning layer 13 as a part of it, or cemented thereto, affording means of positioning base 11 so that it will be properly located with respect to the conductor configuration. Also illustrated are positioning means 19 comprised of properly located holes in base 11' aligned with holes in layer 13 by pins or eyelets or similar means removable without destruction of 13 or 19. Other means of positioning will occur to those skilled in the art.

Figure 7:
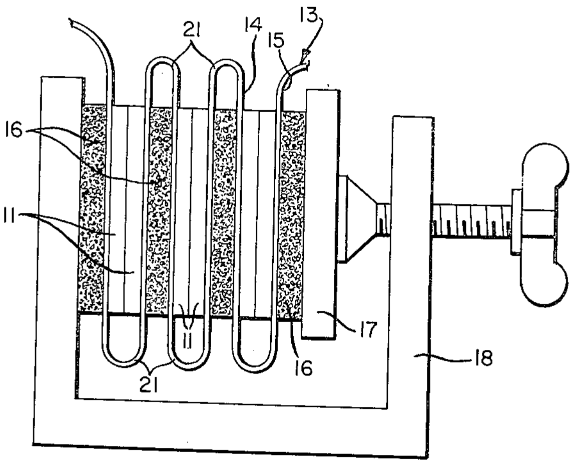
Fig. 7 shows another embodiment of my invention, an assembly of particular shape.

Fig. 7 shows a number of bases 11 bearing cores 12 placed in a convenient configuration, each such panel being positioned in proximity to a coupling area in the positioned conductor pattern. Resilient means 16 such as foam rubber pads are provided to insure intimate contact of the coupling area against the cores 12 despite casual irregularities in the flatness of bases 11 or cores 12. Pressure sufficient to retain the whole is applied by rigid block 17 and pressure means 18. The portions of any conductor 14 or 15 in the coupling area are all connected with each other by the continuations of such conductor through the intermediate loops 21 of the positioned conductor pattern. Thus the continuity of the conductors is here employed to make connections between the various equivalents of conventional matrices, and the flexibility of the conductors and the positioning means is utilized to permit their being bent as required by the particular arrangement of parts here illustrated. It is evident that the ends of the conductor assembly may be employed to make connection to the conductors on the interior of the assembly; and that, furthermore, if the entire conductor assembly is properly formed and positioned on the layer 13, all the internal connections are automatically provided with little possibility of human error, and, indeed, with no separate making of such connections by joints. It is also evident that any base 11 with its group of cores 12 may be removed and replaced without breaking any of the conductor connections; and that the given positioned conductor pattern consisting of 13, 14, and 15 may be replaced by a like or different suitable positioned conductor pattern without injury to the cores 12 or the bases 11, which may be used with the new pattern in like general manner as with the original.

Figure 8:
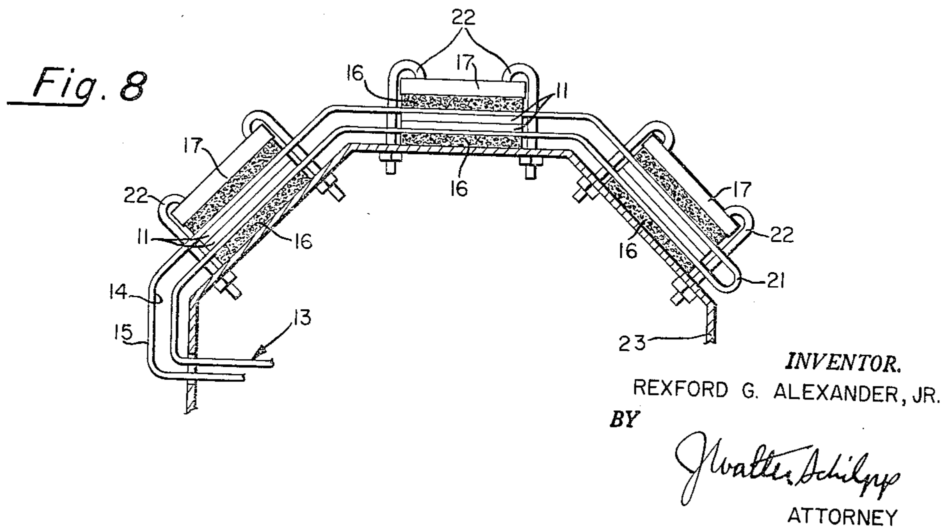
Fig. 8 shows another embodiment of my invention, illustrating particularly the ease with which it may be employed to produce assemblies of unusual shapes.

Figure 8 shows an alternative arrangement of bases 11 carrying groups of cores 12 mounted in proximity to conductors 14 and conductors 15 positioned by positioning layer 13. In this figure, a hollow octagonal body 23, which may represent a container for equipment to be connected to the storage device, serves as the supporting structure for assembly of panels on bases 11 in proximity to positioned conductors 14 and conductors 15 with resilient means 16, the rigid means 17 being held by fasteners 22 against the sides of the body 23, the extreme ends of conductors 14 and conductors 15 being brought within 21 for connection.

In order to portray the practice of my invention most clearly, bases 11 have been illustrated as substantially plane; and for many applications this will be the most convenient and economical form. However, if special requirements exist that bases 11 have surfaces of single curvature, the flexible combination of conductors and positioning means may be applied thereto by flexing; and if surfaces of bases 11 more complex than those of single curvature are desired, my invention may still be practiced by making the form of the flexible combination of conductors and positioning means such as to mate removably with the surfaces of bases 11 bearing cores 12. Also, if cores 12 are embedded in base 11, such an arrangement lies within the contemplated scope of my invention. Similarly, the outermost conductors on the positioned conductor assembly have been shown without additional insulation since this constituted the minimal form of the illustration; but it will obviously be possible and perhaps desirable for certain purposes to insulate all conductors.

Furthermore, materials of bistable electrical characteristics are known and have been used for data storage by applying conductor patterns to them; my invention is applicable to such devices also.

What I claim is:

1. A data store comprising: a multiplicity of rigid bases bearing each a multiplicity of ferromagnetic elements having bistable magnetic characteristics; a pattern of flexible electrical conductors fixed to and insulated by a sheet of flexible electrical insulating material; means for holding the said rigid bases, in different planes, in physical contact and inductive coupling with portions of the said pattern of flexible electrical conductors; the entire combination being characterized by continuity of the said pattern and associated sheet between and among the said bases.

2. A data store comprising a pattern of flexible electrical conductors fixed to and insulated by a sheet of flexible electrical insulating material including coupling areas thereof in each of which the said conductors are disposed to form patterns oriented suitably for operative inductive coupling to a multiplicity of ferromagnetic bistable elements; a multiplicity of rigid bases bearing such said ferromagnetic bistable elements, each said rigid base bearing ferromagnetic bistable elements located suitably for operative inductive coupling to one of said coupling areas of said patterns of conductors by juxtapostion of the said rigid base against the said one of said coupling portions; means for holding each said rigid base against the corresponding said coupling area of the said pattern of conductors.

3. A data store as claimed in claim 2, further characterized by first alignment means in said coupling areas and second alignment means, adapted to mate with said first alignment means, on said rigid bases.

4. A data store comprising, in combination, a plural number of relatively rigid panels, each panel bearing on a face thereof a plurality of ferromagnetic elements possessing bistable magnetic characteristics and each having an axis of preferred magnetization, a sheet of flexible electrical insulating material carrying a pattern of flexible electrical conductors fixed thereto and insulated one from the other by the material of the sheet, and means for holding the sheet against the said faces of the panels with the electrical conductors of the sheet in inductive coupling relation with the ferromagnetic elements of the panel and such that a portion of each conductor extends approximately at right angles to the axis of preferred magnetization of the ferromagnetic element with which it is in inductive relationship.

5. A data store comprising, in combination, a relatively rigid panel bearing on a face thereof a plurality of ferromagnetic elements each having a bistable magnetic characteristic and each further having an axis of preferred magnetization, a sheet of flexible electrical insulating material carrying a pattern of flexible electrical conductors fixed thereto and insulated one from the other by the material of the sheet, and means for holding the sheet against the face of the panel with the electrical conductors of the sheet in inductive coupling relation with the ferromagnetic elements of the panel and such that a portion of each conductor extends approximately at right angles to the axis of preferred magnetization of the ferromagnetic element with which it is in inductive relationship, said means including a layer of resilient material overlying the side of the sheet opposite to the face of the panel and compressed thereagainst to insure intimate surface contact of the sheet with the face of the panel.

6. A data store comprising, in combination, a plurality of relatively rigid panels, each panel bearing on a face thereof a plural number of ferromagnetic elements possessing bistable magnetic characteristics and each having an axis of preferred magnetization, an elongated sheet-like strip of flexible electrical insulating material carrying a pattern of flexible electrical conductors fixed thereto and insulated one from the other by the material of the strip, and mounting means for the panels and the strip and predisposing the panels in different planes with the insulating strip extending from panel to panel in overlying relation to each said face thereof and bent between the panels to accommodate its overlying areas to the planes of the panels, the pattern of the conductors of the strip being in inductive coupling relation with the ferromagnetic elements of the panels and such that the portion of each conductor in inductive relationship with any one of said elements extends approximately at right angles to the axis of preferred magnetization thereof.

7. A data store comprising, in combination, a plurality of relatively rigid panels, each panel bearing on a face thereof a plural number of ferromagnetic elements possessing bistable magnetic characteristics and each having an axis of preferred magnetization, an elongated sheet-like strip of flexible electrical insulating material carrying a pattern of flexible electrical conductors fixed thereto and insulated one from the other by the material of the strip, and means mounting the panels in adjacent parallel planes with the insulating strip reversely bent upon itself and woven between the panels with portions of the conductor of the strip in inductive coupling relation with the ferromagnetic elements of the panels, each portion of the conductors in inductive relation with any one of said ferromagnetic elements being so oriented with respect thereto that it extends approximately at right angles to the axis of preferred magnetization of the element.

8. A data store comprising, in combination, a plurality of relatively rigid panels, each panel bearing on a face thereof a plural number of ferromagnetic elements possessing bistable magnetic characteristics and each having an axis of preferred magnetization, an elongated sheet-like strip of flexible electrical insulating material carrying a pattern of flexible electrical conductors fixed thereto and insulated one from the other by the material of the strip, mounting means for the panels and the strip and predisposing the panels in different planes with the insulating strip extending from panel to panel in overlying relation to each said face thereof and bent between the panels to accommodate its overlying areas to the planes of the panels, the pattern of the conductors of the strip being in inductive coupling relation with the ferromagnetic elements of the panels and such that the portion of each conductor in inductive relationship with any one of said elements extends approximately at right angles to the axis of preferred magnetization thereof, a layer of resilient material individual to each of the panels and overlying the side of the strip opposite to the element bearing face of each panel, and means compressing each such resilient layer against the strip to insure intimate contact of the strip with the faces of the panels.

9. A data store comprising, in combination, a plurality of relatively rigid panels, each panel bearing on a face thereof a plural number of ferromagnetic elements possessing bistable magnetic characteristics and each having an axis of preferred magnetization, an elongated sheet-like strip of flexible electrical insulating material having a length such that the panels may occupy separate spaced areas of the strip, flexible electrical conductors carried by the strip and insulated one from the other by the material of the strip, mounting means for the panels and the strip and predisposing the panels in different planes and the strip in overlying relationship to the element bearing faces of the panels with the sections of the strip between the panels bent to accommodate its overlying areas to the planes of the panels, said conductors extending generally lengthwise of the strip and from one panel occupying area to another thereof, each such conductor having a portion thereof in inductive coupling relation with at least one of the ferromagnetic elements of each panel and such that the portion extends approximately at right angles to the axis of preferred magnetization thereof.

References Cited in the file of this patent

UNITED STATES PATENTS

| | | |
|---|---|---|
| 2,014,524 | Franz | Sept. 17, 1935 |
| 2,634,310 | Eisler | Apr. 7, 1953 |
| 2,703,854 | Eisler | Mar. 8, 1955 |
| 2,782,397 | Young | Feb. 19, 1957 |
| 2,785,389 | Warren | Mar. 12, 1957 |
| 2,824,294 | Saltz | Feb. 18, 1958 |

OTHER REFERENCES

"Foldable Printed Circuits," by H. L. Shortt, pp. 14–17 of "Electronic Equipment" for August 1955.

"Laminates Fill the Needs of Mechanized Assembly," pp. 202–203 of "Electronics" for October 1956.

"A Compace Coincident-Current Memory," by A. V. Pohm and S. M. Rubens, pp. 120–123 of the "Proceedings of the Eastern Joint Computer Conference," Dec. 10–12, 1956 (64–c).

"Flexible Printed Wiring in All Lengths For All Layouts," p. 107 of "Electronic Design" for March 19, 1958.